June 9, 1959   W. M. FOLBERTH   2,890,443
HORN BLOWING DEVICE
Filed Feb. 10, 1958
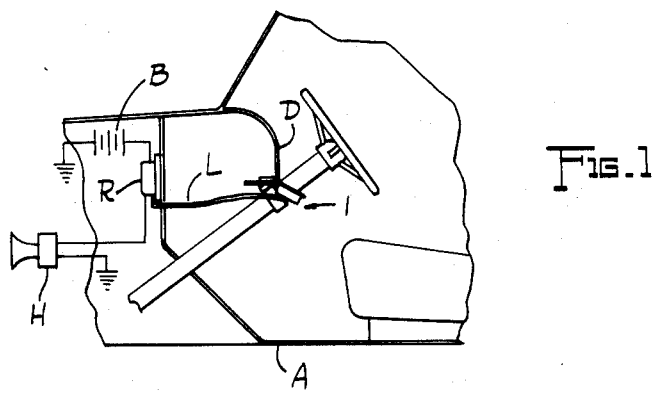
Fig.1
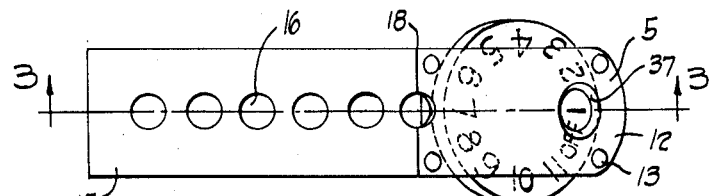
Fig.2
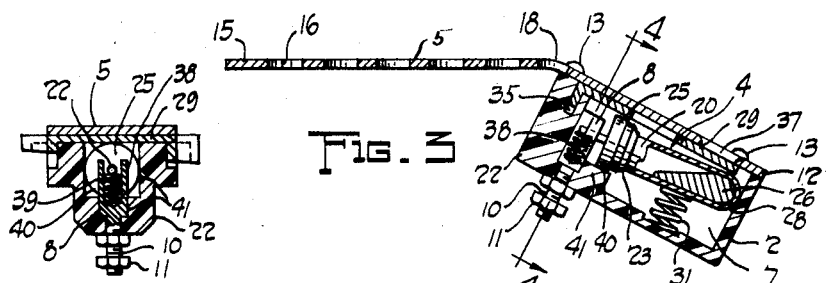
Fig.3
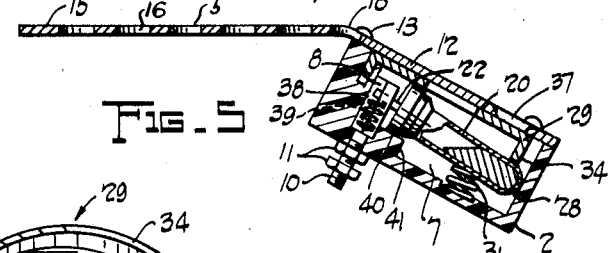
Fig.5
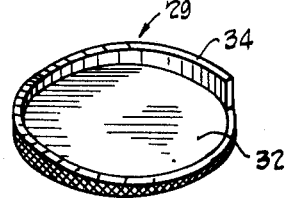
Fig.6
INVENTOR.
WILLIAM M. FOLBERTH
BY Bosworth, Sessions,
Herrstrom & Knowles
ATTORNEYS

United States Patent Office 2,890,443
Patented June 9, 1959

2,890,443

HORN BLOWING DEVICE

William M. Folberth, Cleveland, Ohio

Application February 10, 1958, Serial No. 714,213

7 Claims. (Cl. 340—262)

This invention relates to automatic signaling devices and more particularly to devices for automatically actuating signal horns or other emergency signaling means upon the sudden or rapid deceleration of the automobile or other vehicle upon which they are mounted.

A general object of this invention is to provide an improved device for automatically actuating a motor vehicle horn or other emergency signaling means upon the rapid or sudden deceleration or stopping of the vehicle.

Another object of this invention is to provide an improved device, for automatically actuating a motor vehicle horn or other emergency signaling means upon the rapid or sudden deceleration or stopping of the vehicle, which is actuated by inertia and is readily adjustable for effective response to a predetermined inertia to compensate for individual driving habits, particular use, traffic and driving conditions and the individual springing and momentum characteristics of the particular vehicle upon which the device is mounted.

Other objects of this invention include the provision of an improved device adjustably responsive to inertia for actuating emergency signaling means upon the rapid deceleration of the vehicle, which may include means to render the device selectively inoperative; which may be readily installed on all makes of vehicles; which is foolproof and positive in operation and does not impede the normal use of the vehicle or signaling device to which it is attached; which includes a mercury switch and improved, efficient and advantageous means ensuring a positive electrical connection with the switch; and which has one or more of the above advantages.

Other objects and advantages of the invention will appear from the following description of a preferred form thereof, reference being had to the accompanying drawings in which:

Figure 1 is a schematic side view of a portion of the interior and dashboard of an automobile showing an actuating device embodying the invention mounted in position on the dashboard and connected by suitable leads with the horn relay;

Figure 2 is a top plan view of the actuating device shown in Figure 1;

Figure 3 is a section taken along the line 3—3 of Figure 2;

Figure 4 is a section taken along the line 4—4 of Figure 3;

Figure 5 is a section similar to Figure 3, but showing the actuating device adjusted to require a greater rate of deceleration for actuating the same; and Figure 6 is a perspective view of the underside of a preferred means for adjusting the sensitivity of the actuating device.

As best seen in Figure 1, an actuating device embodying the instant invention is indicated generally at 1 and is adapted to be mounted on an automobile A or other vehicle at a convenient location such as to the underside of the metal dashboard D so as to be accessible to the operator for adjustment. A suitable electrical lead L interconnects the device 1 with the horn relay R, and the electrical circuit is preferably completed through the ground constituted vehicle body itself as is common practice. The relay is connected in conventional manner to the horn H and the battery B. The conventional horn ring or button, not shown, also is arranged to close an electrical circuit to the relay in the usual manner, the circuits from the horn ring to the relay and from the actuating device 1 being in parallel so that the relay is energized and the horn caused to blow whenever either circuit is closed.

Actuating device 1 is adapted to respond automatically to the sudden or rapid, as opposed to ordinary or usual, deceleration of the vehicle upon which it is mounted to close the circuit, energize the horn relay and blow the horn of the vehicle or actuate other suitable emergency signaling devices so as to alert others, either to their danger or to the fact that the vehicle is being brought to an emergency stop. Actuator 1 is adapted to actuate the emergency signaling device so long as emergency deceleration continues and to stop actuation of the emergency signaling device upon the cessation of the emergency deceleration. Since actuator 1 responds automatically to the rapid or emergency deceleration of the vehicle, the operator's feet and hands are available for controlling and stopping the vehicle, and his attention need not be divided between accomplishing the emergency deceleration and blowing the horn or otherwise signaling.

As shown in Figures 2 and 3, an actuator 1 embodying the invention comprises a housing 2, a switch indicated generally at 4, and cover 5. Housing 2 is conveniently of greater length than width and is formed with an internal upwardly opening cavity 7 within which switch 4 is disposed. Housing 2 is preferably formed from a non-conductive or electrical insulating material such as molded plastic and is provided with a binding post 8 mounted within the cavity 7. Post 8 extends through the housing to the exterior thereof and is provided with a threaded external end 10 and suitable nuts 11 so that the electrical lead L may be conveniently secured thereto; the path of the circuit is through the binding post and not the housing.

The otherwise open top of cavity 7 is closed by the cover 5 which also functions as a bracket for attaching the actuator to the vehicle; the cover or bracket is formed of an electrical conductor, such as metal, so as to function as a part of the ground or return for the electrical circuit. One end 12 of cover 5 is secured by any convenient means such as rivets 13 to the housing 2, and the other or bracket end 15 of cover 5 is provided with a plurality of holes or apertures 16 so that the device may be readily attached to the vehicle with the axis of the bracket and of the housing lying in a plane substantially parallel to the longitudinal axis of the vehicle. As noted above, the bracket is preferably mounted on the dash D as shown in Figure 1. Cover 5 is also preferably bent as at 18 so that the end 12 thereof extends downwardly from the end 15 and the housing 2 is supported in a downwardly and rearwardly sloped position as shown. Preferably, the bend 18 is such that the housing is at an angle of about 28° with the horizontal, but this angle is not critical.

As previously noted, a switch 4 is disposed within cavity 7 and is adapted to respond to the forces of inertia incident to rapid deceleration of the vehicle to close the electrical circuit to actuate the horn H or other emergency signaling device. Switch 4 preferably is a mercury switch comprising a circular elongated metal tube 20 which is disposed with its longitudinal axis extending longitudinally of the housing 2. A terminal or contact post 22 extends longitudinally outwardly from one end 23 of tube 20 and is insulated, as by insulator 25, from the body of the tube. A globule of mercury 26 is disposed within the tube. The tube is mounted so that end 23 of the tube is elevated relative to the remainder of the tube, and post 22 is in contact with binding post 8. The structure and operation of switch 4 is such that when the vehicle is at rest, accelerating or undergoing normal deceleration, the mercury, under the influence of gravity, remains at or near the lower end 28 of tube 20 out of contact with post 22, but when the vehicle is rapidly decelerated, the inertia of the mercury causes the mercury to flow to the end 23 of the tube 20 and close the circuit between the post 22 and the tube 20 itself. This energizes the horn relay because binding post 8 is connected to the relay by conductor L while the end 28 of tube 20 is connected to ground by contact with a metal cam 29 which in turn makes contact with the cover 5, the end 15 of which is grounded to the car through the dash D or other convenient mounting.

Because the springing characteristics of various automobiles are different and because various operators have differing driving habits, it is desirable to be able to readily adjust the angle between the longitudinal axis of the switch 4 and the horizontal to the end that a greater or lesser force of inertia is necessary to impel the mercury 25 to the end 23 of tube 20 and close the switch. This is desirable in order to ensure that the actuator does not actuate the emergency signaling device upon normal deceleration of the vehicle but only upon emergency deceleration. The desired adjustment is made by raising or lowering the lower end 28 of the tube 20 relative to the upper end 23 thereof so that the mercury will have a greater or lesser incline up which to flow in order to close the circuit. The tube 20 preferably is moved by the cam 29, which acts upon the upper surface of end 28 to positively locate the same a predetermined distance below the cover 5, and a compression spring 31 acting between the bottom of the cavity 7 and the tube 20 to urge the tube upwardly into engagement with the cam. As shown in Figure 6, the cam 29 preferably has a flat circular body 32 and an arcuate camming surface 34 extending perpendicularly thereto at the periphery thereof. Cam 29 is disposed within the housing immediately below the cover 5 with surface 34 extending downwardly and engaging the upper surface of end 28 of tube 20. The cover 5 retains the cam within the housing and makes contact with the body 32 of the cam to provide the electrical circuit from the tube 20 to ground as noted above. Slots 35, in the upper side walls of the housing, maintain the cam in vertical alignment while permitting it to be rotated a full 360° about its axis.

The upper surface of cam body 32 is preferably provided with a plurality of indicia, such as numbers from 1 to 10 (see Figure 2), for indicating the relative position of the camming surface; an aperture 37 in end 12 of cover 5 permits the numbers to be observed. Conveniently, the indicia are arranged so that the higher the number thereof the greater the rate of deceleration necessary to actuate the device, i.e., the greater the angle between the tube 20 and the horizontal.

In order to preclude contact post 22 from becoming separated from binding post 8 and preventing the closing of the electrical circuit, the binding post preferably is bifurcated as at 38, and the contact post 22 is of sufficient length to extend within the bifurcated portion 38 of the post 8. The cavity 7 is only slightly longer than tube 20 so that post 22 cannot be withdrawn from the bifurcated portion, and a metallic spring 39 is disposed within the bifurcated portion and acts between the post 8 and the post 22 to ensure a firm electrical contact therebetween. When the end 28 of tube 20 is raised or lowered, the tube pivots about the enlarged flange 40 of the tube, which rests on a transverse web 41 in the housing, and the electrical connection between post 22 and post 8 is positively maintained regardless of the angular position and adjustment of tube 20 and cam 29 by the action of the spring 38 and the fact that the cover 5 limits the upward displacement of the end 23 of tube 20.

Figure 5 shows the relative disposition of tube 20, cam 29 and spring 31 when the cam has been adjusted so that a maximum rate of deceleration is necessary to complete the actuator circuit. Obviously the actuator may be adjusted so as to require rates between the maximum and minimum limits by simply rotating the cam 29 about its vertical axis until the desired result is obtained. Further, the actuator may be provided with means for making it inoperative so that it will not respond to an emergency deceleration as by, for example, the provision of means for selectively breaking the electrical circuit between tube 20 and cam 29. This may be accomplished by means of a patch or insert of non-conducting material placed along a portion of the camming surface 34 so that the circuit between the tube and the cam 29 would be broken when the cam is adjusted either so that the non-conducting part of surface 34 engages the upper surface of end 28 of tube 20.

In operation, the actuator embodying the invention is mounted on the underside of the dashboard of the vehicle and an electrical lead is connected between binding post 8 and the horn relay, for example. The slope of the tube is adjusted by the cam 29 so that normal stopping and slowing of the vehicle does not cause the mercury to be displaced sufficiently to close the circuit, but so that an emergency stop causes the horn to blow. The driver can make the adjustment quickly by making a few test stops; then can note the number appearing in window 37 when the desired adjustment is achieved.

Thereafter, should an emergency arise requiring the sudden and rapid deceleration of the vehicle, the operator responds in the normal way to stop the car, having both his hands and feet available for this purpose. The moment the rapid or emergency deceleration commences the inertia of the mercury 26 causes the same to be displaced upwardly and forwardly in tube 20 to the end 23 thereof, thereby closing the gap between post 22 and tube 20 and completing the electrical circuit and actuating the horn. As soon as deceleration of the vehicle is accomplished and the vehicle stops, the mercury runs down to the lower end 28 of the tube 20, breaking the circuit and stopping the horn. Different adjustments of the cam may be desired by different drivers or be required by different loads in the same car. The numbers appearing in the aperture 37 make is possible readily to re-adjust the device to a previously determined setting.

Those skilled in the art will appreciate that various changes and modifications can be made in the invention without departing from the spirit and scope thereof. The essential features of the invention are described in the appended claims.

I claim:

1. A device for actuating emergency signaling means in vehicles and the like in response to the rapid deceleration thereof, said device comprising a housing having therein an upwardly opening cavity with a bottom, a switch disposed in said cavity and a metallic cover secured to said housing and having a first portion closing said cavity and a second portion extending longitudinally beyond said housing in a direction parallel with the longitudinal axis of the vehicle, said second portion of said cover being angularly related to said first portion of said cover and having a plurality of apertures for mounting said device on the vehicle, said housing having a bifurcated binding post disposed in said cavity adjacent the end thereof nearest said second portion of said cover and extending through said housing and externally thereof, said binding post having a spring disposed within said bifurcated portion and said external portion of said binding post being adapted for connection with an electrical lead, said switch comprising a metallic tube having a longitudinal axis extending parallel with the longitudinal axis of said cover and vehicle and having an upper end adjacent said binding post and a lower end, a metallic, central contact post extending from said upper end of said tube, an electrical insulator separating said contact post and said tube, a predetermined quantity of mercury disposed within said tube, a metallic cam comprising a flat circular body having an upper surface and a peripheral, downwardly extending, cylindrical wall constituting a downwardly facing camming surface, and a second spring disposed within said cavity and operating between said tube and said bottom of said cavity, said contact post extending within said bifurcated binding post and engaging said first named spring for pivotal motion about a transverse axis within said housing, said cam being disposed between said cover and tube with said camming surface bearing upon and engaging said lower end of said tube, said housing having arcuate slots for receiving said camming surface and maintaining said cam in alignment, said cam being adapted to be rotated about an axis perpendicular to said housing, indicia on said upper surface of said cam and an aperture in said first portion of said cover for viewing said indicia.

2. A device for actuating emergency signaling means in vehicles and the like in response to the rapid deceleration thereof, said device comprising a housing having a metallic cover and a switch disposed in said housing, said cover having an angularly related portion extending longitudinally beyond said housing in a direction parallel with the longitudinal axis of the vehicle and being adapted to secure said device on the vehicle with said housing disposed at an angle with the horizontal, a bifurcated binding post carried by said housing and being adapted for connection with an electrical lead, said switch comprising a metallic tube having a longitudinal axis extending parallel with the longitudinal axis of said cover and vehicle and having an upper end adjacent the bifurcated portion of said binding post and a lower end, an electrically conductive contact post extending from said upper end of said tube and within said bifurcated portion of said binding post and being in electrically conductive engagement therewith and said tube and central post having pivotal motion about a transverse axis within said housing, an electrical insulator separating said metallic contact post and said tube, a predetermined quantity of mercury disposed within said tube, a metallic cam comprising a flat circular body having an upper surface and a peripheral, downwardly extending, cylindrical wall constituting a downwardly facing camming surface and disposed with said camming surface bearing downwardly upon said lower end of said tube, spring means urging said lower end of said tube upwardly against said camming surface and indicia on said upper surface of said cam, said cam being adapted to be rotated about an axis perpendicular to said body.

3. A device for actuating emergency signaling means in vehicles and the like in response to the rapid deceleration thereof, said device comprising a housing having switch means therein and being adapted to be mounted on the vehicle, a bifurcated binding post carried by said housing and adapted for connection with an electrical lead, said switch means comprising a metallic tube having a longitudinal axis extending parallel with the longitudinal axis of the vehicle and having an upper end disposed adjacent said binding post and a lower end, an electrically conductive contact post extending from said upper end of said tube and within said bifurcated portion of said binding post and being in electrically conductive engagement therewith, said contact post supporting said tube for pivotal motion about a transverse axis within said housing, an electrical insulator separating said contact post and said tube, a predetermined quantity of mercury disposed within said tube, spring means urging said lower end of said tube upwardly about said pivotal axis and an electrically conductive cam having a downwardly extending, cylindrical wall constituting a downwardly facing camming surface, said camming surface engaging and bearing downwardly on said lower end of said tube and means adapted to electrically connect said cam with the body of the vehicle, said cam being adapted to be rotated about an axis parallel with said cylindrical wall.

4. The device according to claim 3 with means to break the electrical contact between said tube and cam.

5. A device for actuating emergency signaling means in vehicles and the like in response to the rapid deceleration thereof, said device comprising a housing having switch means therein, a bifurcated binding post carried by said housing and adapted for connection with an electrical lead, said switch means comprising a metallic tube having a longitudinal axis adapted to extend parallel with the longitudinal axis of the vehicle on which said device is to be mounted and having an upper end disposed adjacent said binding post and a lower end, an electrically conductive contact post extending from said upper end of said tube and within said bifurcated portion of said binding post and being in electrically conductive engagement therewith, said contact post supporting said tube for pivotal motion about a transverse axis within said binding post, an electrical insulator separating said contact post and said tube, a predetermined quantity of mercury disposed within said tube, spring means urging said lower end of said tube upwardly about said pivotal axis and cam means engaging and bearing upon said lower end of said tube and urging said tube in opposition to said spring means.

6. A device for actuating emergency signaling means in vehicles and the like in response to the rapid deceleration thereof, said device comprising a housing having switch means therein and carrying a binding post adapted for connection with an electrical lead, said switch means comprising a metallic tube having a longitudinal axis adapted to extend parallel with the longitudinal axis of the vehicle on which said device is to be mounted and having an upper end disposed adjacent said binding post and a lower end, an electrically conductive contact post extending from said upper end of said tube and being in electrically conductive engagement with said binding post, an electrical insulator separating said contact post and said tube, a predetermined quantity of mercury disposed within said tube, spring means urging said lower end of said tube upwardly relative to said upper end of said tube while said posts remain in electrically conductive engagement, and an electrically conductive cam having a downwardly extending cylindrical wall constituting a downwardly facing camming surface, said camming surface engaging and bearing downwardly upon said lower end of said tube and opposing said spring means, said cam being adapted to rotate about an axis parallel with said cylindrical wall.

7. Signaling means comprising in combination a vehicle having a body and a longitudinal axis, and a storage battery, a horn, a horn relay, a plurality of horn actuating devices and a plurality of electrical leads carried by said vehicle, said electrical leads interconnecting said vehicle body, battery, horn relay, horn, and actuating devices in an electrical circuit with said actuating devices in parallel, one said actuating device comprising a housing having a mercury switch therein and a binding post secured to one said electrical lead, said switch having a longitudinal axis extending parallel with the longitudinal axis of said vehicle, one end of said switch being disposed adjacent to and having electrically conductive engagement with said binding post, the other end of said switch being disposed horizontally lower than said one end of said switch and being electrically insulated therefrom, a predetermined quantity of mercury in said switch, said mercury being normally disposed in said other end of said switch and having movement within said switch for electrically interconnecting said ends thereof, spring means urging said other end of said switch upwardly relative to said one end of said switch, an adjustable, electrically conductive cam engaging and bearing upon said other end of said switch and opposing displacement thereof in response to said spring means and electrically conductive means engaging said cam and interconnecting said cam and said electrical circuit.

References Cited in the file of this patent
UNITED STATES PATENTS

| | | |
|---|---|---|
| 2,530,461 | Gund | Nov. 21, 1950 |
| 2,733,310 | Tratsch | Jan. 31, 1956 |
| 2,734,103 | Raynor | Feb. 7, 1956 |
| 2,751,575 | Jacobs et al. | June 19, 1956 |
| 2,802,204 | Kennelly et al. | Aug. 6, 1957 |
| 2,811,597 | Havelka | Oct. 29, 1957 |
| 2,831,183 | Womack | Apr. 15, 1958 |